United States Patent [19]

Nittmann

[11] 3,990,794

[45] Nov. 9, 1976

[54] COPYING MACHINE DOCUMENT FOLDER

[75] Inventor: Herbert Nittmann, Vienna, Austria

[73] Assignee: Rank Xerox Ltd., London, England

[22] Filed: Mar. 3, 1975

[21] Appl. No.: 554,840

[30] Foreign Application Priority Data

Mar. 4, 1974 Austria ............................... 1771/74

[52] U.S. Cl. .................................... 355/75; 355/40; 355/71

[51] Int. Cl.[2] .......................................... G03B 27/62

[58] Field of Search ........................... 355/40, 75, 71

[56] References Cited

UNITED STATES PATENTS

| | | | |
|---|---|---|---|
| 2,740,324 | 4/1956 | Cahill, Jr. | 355/40 |
| 3,544,212 | 12/1970 | Umahashi et al. | 355/75 X |
| 3,669,536 | 6/1972 | Scott | 355/40 |
| 3,880,521 | 4/1975 | Eppe et al. | 355/40 |

*Primary Examiner*—Richard A. Wintercorn

[57] ABSTRACT

A method and apparatus for producing a single copy from a plurality of originals includes a means for positioning a first original or mask having an open portion or portions therein over an exposure platen, a means for laying a second original or master bearing a plurality of areas of information over the open portion of the first original to produce a copy bearing the information from one area and a means for moving the master between copies to produce another copy bearing information from a different area.

2 Claims, 6 Drawing Figures

COPYING MACHINE DOCUMENT FOLDER

This invention relates to apparatus for copying a selected area from a document.

Previously, when it was desired to copy only selected areas from a document, an overlay has been used which is placed over the document when it is copied, the overlay having transparent areas for the selected areas and opaque areas for the non-selected areas. Additional information may be added to the copy by printing on the opaque areas of the overlay. When it is desired to change the selected areas of the document, it is necessary to move the overlay relative to the document, or to replace it with another overlay with a different pattern of transparent and opaque areas. This step is too expensive in time and requires a skilled operator.

It has also been proposed to mount a series of overlays in the form of a web, the web being movable between the document and the copying window of a copying machine so that different overlays are presented in turn in conjunction with the master document for copying. This enables different areas of the master document to be copied at different times under the control of a program and without the intervention of an operator between the copying of different areas. However, the master document is stationary relative to the copying window, so that a piece of information on the master document will always appear at the same position on the copy when it is selected for copying. When it is desired to make the copy in the form of a list of goods with a heading at the top, the heading can be printed on the top of each overlay, and different overlays can be provided on the web for selecting the appropriate goods for each list from all the goods set on the master document. However, the copied list will appear with the heading at the top and the various goods at different positions on the copy, whereas for neatness and saving of paper, it is preferred to have selected information on the list appearing on the copy immediately below the heading. This result can be achieved in the present invention.

According to one aspect of the invention there is provided a copying machine having a copying window, means for supporting a master document containing areas of information extending in one direction across the document over the window, means for moving the document support at right angles to said one direction and control means for moving the master document support in steps so that successive areas of information are presented at a given position on the copying window. The apparatus may be used with a mask which co-operates with the copying window to allow only one selected area from the master document to be copied in each position of the master document. This mask may have a transparent window at the appropriate position, or it may be shaped so that part of the copying window is not blanked off by the mask.

According to another aspect of the invention there is provided a method of copying selected portions of a master document, which document contains areas of information extending in one direction across the document comprising placing the document in a document support over the copying window of a copying machine, moving the document support at right angles to the said one direction, masking a portion of the copying window, and controlling the movement of the master document support in conjunction with the operation of the copying machine so that the master document is moved relative to the copying window and a copy of the mask together with the unmasked portions of the master document is made for selected positions of the master document.

An example of the invention will now be described with reference to the accompanying drawings, in which.

Figure 1:
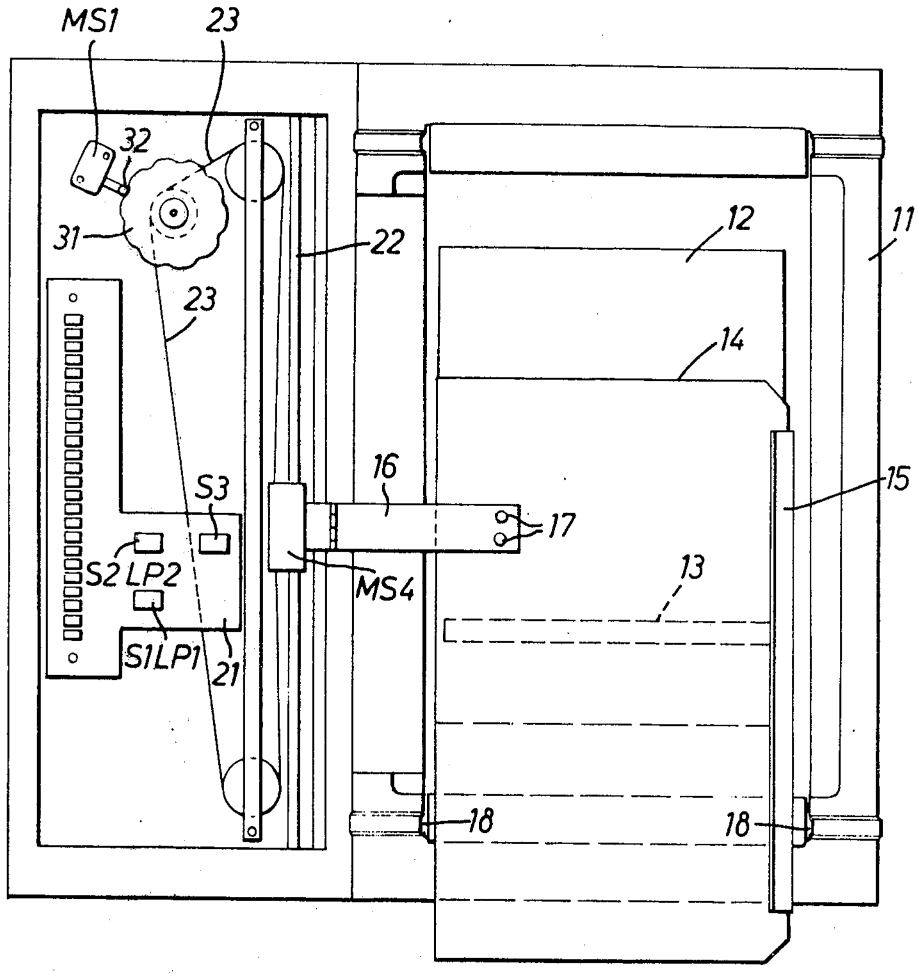
FIG. 1 is a plan view of the apparatus with some protective covering removed.

In FIG. 1, a frame 11 is shown on the right hand side, which frame extends over the curved copying window of the copying machine as described in U.S. Pat. No. 3,512,885. Over the copying window of the copying machine, there is placed a mask 12 having a transparent window 13 extending across its width. Above the mask 12, there is supported a double-sided transparent document support 14. The support is folded at the left hand side, and is provided with a handle 15 attached to the top sheet at the right hand side to enable the top sheet to be lifted away from the bottom sheet of the support 14.

The mechanism for moving the support 14 relative to the mask 12 and the frame 11 is contained within the control panel 21 on the left hand side of FIG. 1, and a hinged strap 16 connects the mechanism in the panel 21 and the support 14. A microswitch MS4 is actuated by the hinging of the strap 16. The support 14 is attached to the strap 16 by means of knurled screws 17. The strap 16 is attached to the upper sheet only of the support 14, so that a document can be slid under the strap up to the fold on the left hand side of the support 14. The strap 16 is moved along the rail 22 by a cable 23 driven by a motor M (see FIG. 6), that is at right angles to the elongated direction of the window 13 in the mask 12 and parallel to the axis of the cylindrical copying window of the machine. In order to enable the document support to pass easily over the ends of the frame 11, the frame is cut away at 18 at each end to allow the document support to remain within the object plane of the copying machine as it moves over the ends of the frame 11.

Figure 2:
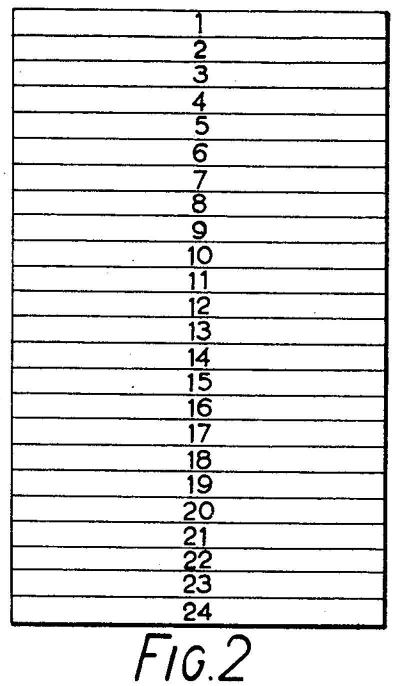
FIG. 2 shows a master document divided into 24 equal strips.
Figure 3:
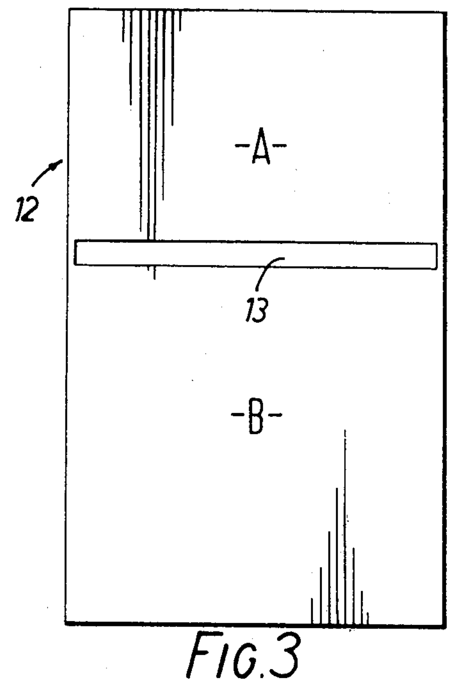
FIG. 3 shows a mask for selecting one of the strips of the document of FIG. 2 for copying.

FIG. 2 shows a master document containing information set out in 24 equal strips indicated by the numbers 1 to 24. Each strip extends across the width of the document, and the strips are located one below the other down the length of the document. FIG. 3 illustrates the mask 12 for use with the master document, a transparent window 13 being provided in the mask which is large enough to allow a single line of information to be copied from the master document. The area A on the mask above the window 13 is printed with information which is required on every copy to be made with the present apparatus and additional information can be placed upon the area B if required.

Figure 4:
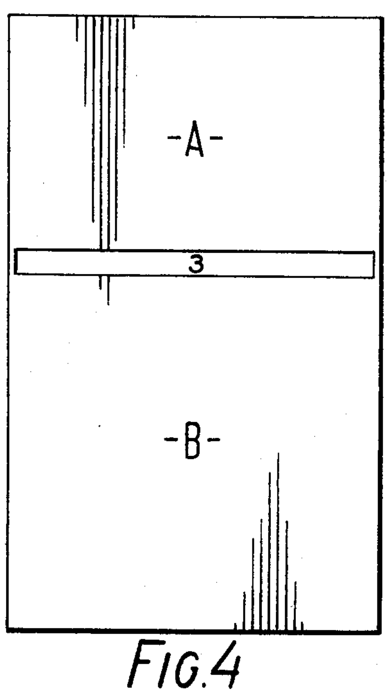
FIGS. 4 and 5 show the copy made by the mask and document in different relative positions.
Figure 5:
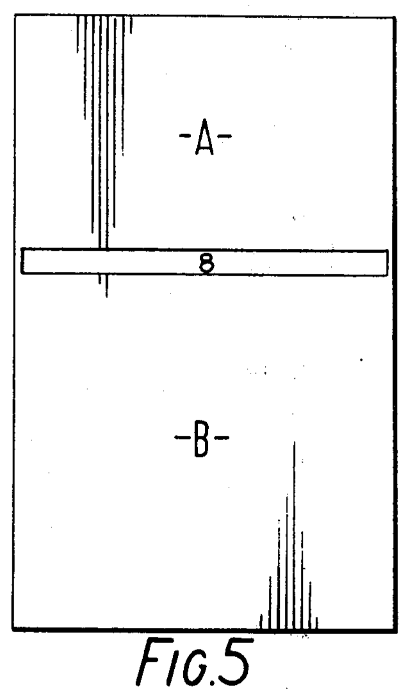

FIG. 4 illustrates the copy which would be made from the master document behind the mask in the third position of the document support. The copy comprises the areas A and B of information, together with the third strip from the master document. FIG. 5 illustrates the copy which would be made from the combination in the eighth position of the document dupport. Here, the copy comprises areas A and B of information, together with the eighth strip from the master document. The copies in FIGS. 4 and 5 contain the same information from the mask, and different selected portions from the master document. The selected portions from the master document appear at the same position on each copy.

It would be possible for the mask to contain just the area A, without a transparent window as such and without the opaque area B, if the size of the copy sheet being used in the machine is so small that the copy which is made contains the information from the area A and only the selected portion from the master document which is available beyond the bottom edge of the mask. The lines below the selected portion of the master document will not be copied because the copy sheet is too small to receive them.

On the control panel 21, there are provided 24 sliding switches, an ON-OFF switch S1 combined with an indicator lamp LP1 to show when the apparatus is switched on, a manual switch S2 which is combined with a lamp LP2 to indicate when the mechanism is in its start position, and a HOLD-LINE switch S3. Below the control panel, there is a position cam 31 driven by a reversible motor M (only shown in FIG. 6). The position cam has ten depressions equally spaced about its periphery and a cam follower 32 actuates a microswitch MS1 (also shown in FIG. 6) when it enters one of the depressions. The circuit of FIG. 6 includes a uniselector having two banks of contacts, each bank having one contact for each position of the document support together with an end contact. The contacts of one bank are connected to respective slide switches (which can be seen in FIG. 1) to a common line. The motor M has a forward winding energised through RL4/1 and a reverse winding energised through RL4/2. The two windings are connected through C3.

Figure 6:
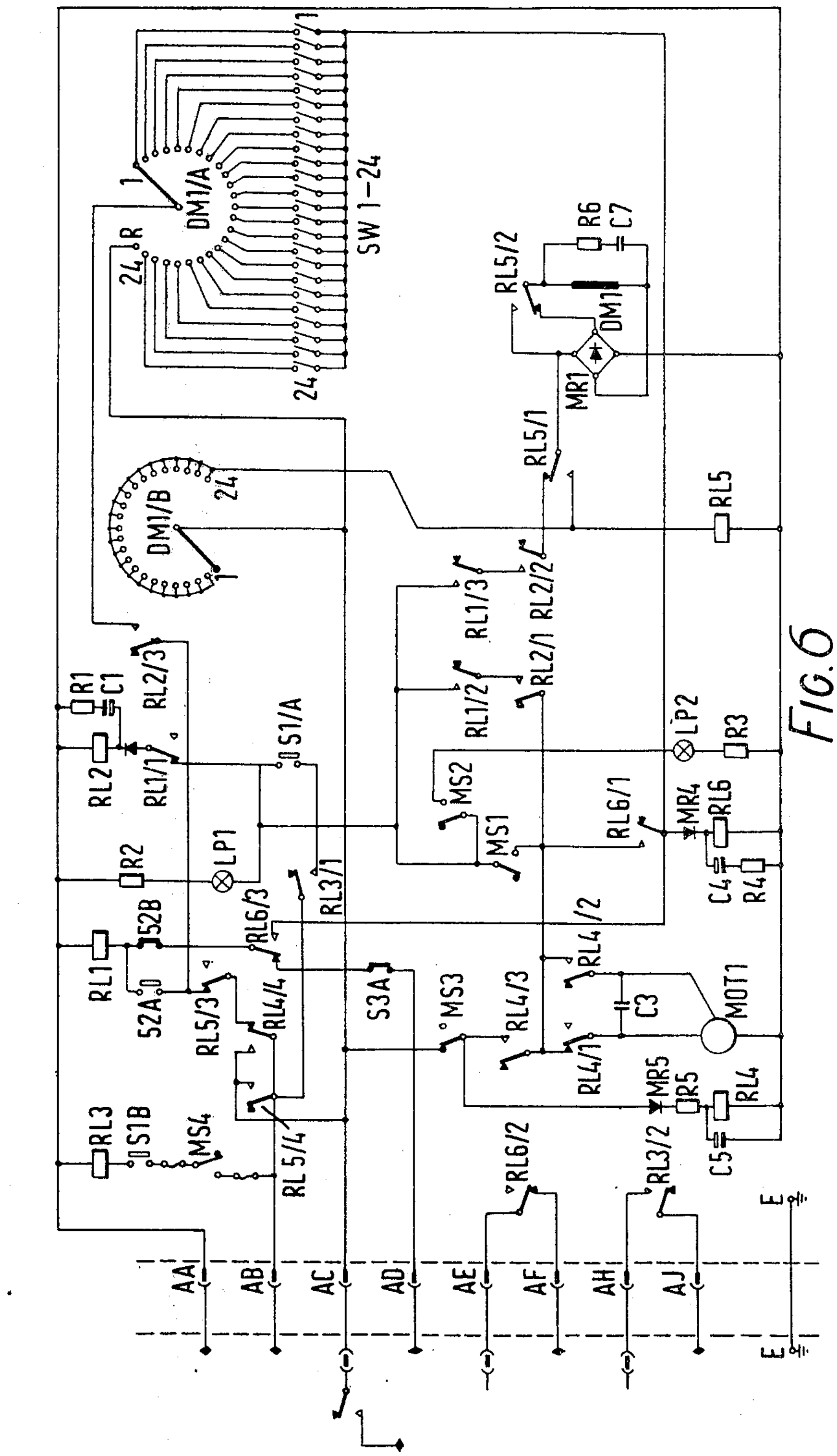
FIG. 6 is a circuit diagram of the apparatus.

The circuit of FIG. 6 includes six relays, of which relays RL1, RL2 and RL3 are used in causing the motor M to step forward to move the document support forwards, RL4 is used to return the motor and the support to its initial position, RL5 is used to return the uniselector to its initial position and RL6 is used in conjunction with the appropriate slide switch when it is desired that no copy should be made when the document support is in a particular position.

Four microswitches are provided, MS1, mentioned above, being actuated by the position cam, MS2 and MS3 being actuated when the motor and the document support are in their initial position, and MS4, mentioned above, being closed when the strap 16 has been hinged down to hold the document support 14 flat.

When S1 is opened, it closes contacts S1A and S1B, when S2 is actuated it closes contacts S2A and opens contacts S2B, and S3 opens contact S3A on actuation, S3 can be used to cause the document support to remain at a given position in order that the machine can make more than one copy without movement of the document support.

Power is supplied between terminals AA and AB in FIG. 6. Relay RL3 is energized when the on/off switch S1 is closed through contacts S1B and through the contacts of MS4 which is actuated when the flap of the document support 14 is lowered. Relay RL3 is only de-energized when the flap of the document support is raised or the on/off switch is opened. Power is supplied from terminal AB through contact RL3/1 and S1A to energize the on lamp LP1 through resistor R2 to indicate the apparatus has been switched on.

At the initial position of the support 14, microswitch MS2 is closed to energize lamp LP2 through resistor R3 in parallel with the one lamp LP1.

On energization of RL3 power is connected to energize relay RL2 through RL3/1, S1A, normally closed contact RL1/2 and MR2. A parallel arm comprising R1 and C1 is provided to delay the de-energization of relay RL2. RL3/2 closes to connect terminals AH and AJ which are connected to the platen interlock of the copying machine, so as to control the billing system in accordance with the multiple copies being made.

The apparatus can be used in a manual or an automatic mode in conjunction with the copying machine which can be of the type described in U.S. Pat. No. 3,512,885, under the control of switch S2. In the manual mode the document support 14 is stepped forward by momentarily closing S2A, to energize RL1 through the contacts RL5/3 and RL4/4 from line AB. In the automatic mode S2A is open, but S2B is closed so that a voltage is applied at the appropriate line in the machine's copying cycle at terminal AD through S3A when closed and contact RL6/3 to energize RL1. Energization of RL1 can be prevented in the automatic mode by opening the HOLD switch contacts S3A when a further copy is required before the mechanism is moved on.

On energization of relay RL1, contacts RL1/1 open and relay RL2 will be de-energized slowly due to the action of R1 and C1. There will thus be a momentary electrical connection to the series arm comprising the normally open contacts RL1/2 and RL2/1 to energize the motor M through contact RL4/1, S1A and RL3/1. The motor M will thus lift the cam follower out of one of the depressions in the cam 31 and close the microswitch MS1. MS1 now provides a parallel arm for the contacts RL1/2 and 2/1 so that the motor M will continue to rotate the positioning cam 31 until the cam follower reaches the next depression and opens MS1. This movement of the motor is sufficient to move the document support by a distance equal to the line separation of the master document.

During the short period when RL1 and RL2 are both energized contacts RL1/3 and RL2/3 provide a momentary connection of the full wave rectifier to terminals AA and AB through contacts RL5/1, S1A and RL3/1. The full wave rectified current is applied through contact RL5/2 to the uniselector DM1 and the current pulse is sufficient to move the uniselector by one position for every step of the motor. When it is required that no copy should be made with the mask in a given position, the slide switch appropriate to that position is closed, producing a connection from terminal AB through contacts RL4/4 and RL5/3 and RL2/3 during energization of relay RL2 through the contact bank DM1/A of the uniselector to energize the relay RL6 through diode MR4. Contact RL6/2 is normally closed to connect terminals AE and AF to allow the paper feeding mechanism of the main copying machine to operate, and on energization of RL6 paper feeding is inhibited. Contact RL6/3 is switched over to separate later pulses from terminal AD. In the other position of contact RL6/3 relay RL1 is energized to secure an automatic sequence of steps of the apparatus. Contact RL6/1 closes whereby current is supplied to the motor via relay RL6, the sequence of steps of the motor being controlled by switch MS1.

In the automatic mode, the stepping and copying continue until the contact DM1/A of the uniselector reaches its end position, or until a reset pulse is applied from the copying machine at terminal AC. In either event, the voltage pulse is connected through microswitch MS3 and diode MR5 to energize relay RL4 which has C5 in series and R5 in parallel. Contact RL4/4 closes to connect between terminals AB and AC in order to hold relay RL4 energized. Contact RL4/2 and RL4/3 close in order to energize the reverse winding of motor M so as to return the document support to its initial position. At the initial position, contact MS3 opens to stop the reverse motion of the motor. Contact RL4/1 opens to remove electrical power from the forward winding of the motor. Terminal AC is connected through the switch DM1/B in all positions of the carriage except its initial position to energize relay RL5, thus converting the rectifier into a half-wave rectifier which causes the uniselector to return to its original position. At its original position, the connection through switch DM1/B is opened, thus de-energizing relay RL5 and stopping the reverse movement of the uniselector. The apparatus is now ready to start a new copying run.

What we claim is:

1. A copying machine having a copying window, means comprising a hinged folder for supporting a master document containing areas of information extending in one direction across the document over the window, means for moving the document support at right angles to said one direction and control means for moving the master document support in steps so that successive areas of information are presented at a given position on the copying window, the control means being responsive to the folder being opened.

2. A copying machine having a copying window, means for supporting a master document containing areas of information extending in one direction across the document over the window, means for moving the document support at right angles to said one direction, said document support moving means being responsive to the copying cycle of the copying machine to move the document at a given point in the cycle; and, control means for moving the master document support in steps so that successive areas of information are presented at a given position on the copying window, said control means being arranged to inhibit the document support means at any predetermined position so that the copying machine can take more copies of the document at that position.

* * * * *